United States Patent [19]

Morishita et al.

[11] Patent Number: 4,828,594
[45] Date of Patent: May 9, 1989

[54] PROCESS FOR THE PRODUCTION OF GLASS

[75] Inventors: Hiroshi Morishita, Kanagawa; Hiroshi Namikawa, Tokyo; Youji Koguchi, Kanagawa; Shin-Ichi Miyake, Tokyo; Terukazu Imayoshi; Hitoshi Kikuchi, both of Kanagawa; Akihiro Nakamura, Tokyo, all of Japan

[73] Assignee: Japan Oxygen Co., Ltd., Japan

[21] Appl. No.: 126,104

[22] PCT Filed: Feb. 27, 1987

[86] PCT No.: PCT/JP87/00124

§ 371 Date: Oct. 27, 1987

§ 102(e) Date: Oct. 27, 1987

[87] PCT Pub. No.: WO87/05285

PCT Pub. Date: Sep. 11, 1987

[30] Foreign Application Priority Data

Feb. 28, 1986 [JP] Japan ................. 61-43797
Feb. 28, 1986 [JP] Japan ................. 61-43798

[51] Int. Cl.[4] ............... C03C 10/00; C03B 19/02
[52] U.S. Cl. ........................... 65/18.4; 65/33; 65/66; 65/134; 65/136; 65/DIG. 8
[58] Field of Search ............. 65/18.4, 22, 33, 66, 65/134, 136, DIG. 8, 30.12

[56] References Cited

U.S. PATENT DOCUMENTS

| | | | |
|---|---|---|---|
| 805,139 | 11/1905 | Hitchcock | 65/136 |
| 1,549,597 | 8/1925 | Miller | 65/66 |
| 1,645,080 | 10/1927 | Watson | 65/136 X |
| 2,726,487 | 12/1955 | Cummins et al. | 65/DIG. 8 |
| 3,883,337 | 5/1975 | Helgesson et al. | 65/31 |
| 3,927,697 | 12/1975 | Baumler et al. | 65/DIG. 8 |
| 4,013,436 | 3/1977 | Van der Steen | 65/136 X |
| 4,042,361 | 8/1977 | Bihuniak et al. | 65/18 |
| 4,093,771 | 6/1978 | Goldstein | 428/312 |
| 4,146,379 | 3/1979 | Copley et al. | 65/18 |
| 4,225,330 | 9/1980 | Kakuzen et al. | 65/18 |
| 4,414,282 | 11/1983 | McCollister et al. | 65/32 X |
| 4,416,680 | 11/1983 | Bruning et al. | 65/144 |
| 4,429,009 | 1/1984 | Pastor et al. | 65/33 X |
| 4,465,656 | 8/1984 | Pastor et al. | 423/339 |

FOREIGN PATENT DOCUMENTS

| | | |
|---|---|---|
| 54-24919 | 2/1979 | Japan. |
| 54-36951 | 3/1979 | Japan. |
| 54-36742 | 3/1979 | Japan. |
| 54-74818 | 6/1979 | Japan. |
| 61-58832 | 3/1986 | Japan. |
| 61-58822 | 3/1986 | Japan. |
| 61-58823 | 3/1986 | Japan. |
| 61-58824 | 3/1986 | Japan. |
| 62-30633 | 2/1987 | Japan. |
| 62-30634 | 2/1987 | Japan. |

OTHER PUBLICATIONS

Vacuum, The International Journal and Abstracting Service for Vacuum Science and Technology, vol. 13, Pergamon Press, 1963, pp. ii, 47–52.

Boganov et al, "Threshold of Light Breakdown in Hydroxyl-Free High-Purity Vitreous Silica", *Soviet Journal of Glass Physics and Chemistry*, vol. 6, No. 5, Sep.-/Oct. 1980, pp. 383–390 (English Language Translation by Plenum Publishing Corporation).

Rabinovich et al, "Preparation of High-Silica Glasses from Colloidal Gels: I, Preparation for Sintering and Properties of Sintered Glasses", *Journal of the American Ceramic Society*, vol. 66, No. 10, Oct. 1983, pp. 683–688.

Kingery et al, *Introduction to Ceramics, Second Edition*, John Wiley & Sons, Inc., 1976, pp. 274–275.

*Primary Examiner*—Robert L. Lindsay
*Attorney, Agent, or Firm*—Lowe, Price, LeBlanc, Becker & Shur

[57] ABSTRACT

The present invention relates to a process for the production of a glass from silica as a raw material by a vacuum melting method, in which a high quality glass is produced efficiently by compounding a silica powder containing an excess amount of the accelerator for phase conversion and silica powders containing substantially no such accelerator or by introducing silica powders in a solution containing an accelerator for phase conversion, adding an acid or basic component to the mixture to adjust the pH thereof, stirring the mixture for mixing, and subjecting the mixture to dehydration and drying to obtain silica powders containing the accelerator for phase conversion in proper quantities, filling the resultant silica powders in a vessel and heating the powder to form a sintered molded body having cristobalite phase having a self-supporting property and also having a proper matrix strength and a high porosity, and then heating the sintered body under vacuum.

10 Claims, 2 Drawing Sheets

PROCESS FOR THE PRODUCTION OF GLASS

TECHNICAL FIELD

The present invention relates to a process for the production of a glass by a vacuum melting method using silica as a raw material.

Background Technology

In general, glasses as industrial products are produced by heating raw material powders prepared in a prescribed mixing proportion in a crucible or a tank furnace at temperatures higher than the liquids temperature to form a homogeneous mixture in the melted state and then cooling the mixture. In the production of a glass, the glass is usually made transparent, for example, by a means in which the bubbles in the melt formed from the adsorbed gas in the raw materials and the gas generated during the reaction are removed by elevating the temperature of the melt to reduce its viscosity sufficiently thereby allowing the gases and bubbles to float to its surface.

However, in the case of producing a glass from silica as the raw material, because of its high melting point, the temperature cannot be elevated to an extent effective for removing bubbles because of restrictions such as the high viscosity of the melt, refractoriness required for the crucible or furnace and for other reasons. If the temperature is elevated excessively, gases are generated by the volatilization of the raw material per se and the reaction between the raw material and the crucible forms all the more bubbles. Therefore, the above-described method cannot be employed. For the reasons set forth above, a method for the production of a transparent quartz glass using silica as the raw material is restricted to any one of the following methods:

(1) A method in which a silica powder is gradually fed into an argon-oxygen plasma flame or an oxygen-hidrogen flame and melted for glass formation and the resulting melt is deposited onto a stand. The generated gases are dissipated from the surface (Verneuil method);

(2) A method in which a porous body composed of silica fine particles is prepared and melted from one end thereof in the band-like state for glass formation. The generated gases leave from the unmelted porous body (zone melting method); and (3) A method in which rock crystal powders prepared to have particle diameter of about 100 μm are placed in a crucible and melted in a vacuum furnace for glass formation. The generated gases are removed by force (vacuum melting method).

However, with respect to the method (1) and method (2), it is well known that an extremely long period of time is required for producing one glass block and productivity is poor, and especially in the case of the Verneuil method, the yield is as low as 30% to 40%. Further, in the case that the argon-oxygen plasma flame is employed as a heat source, though a glass having a small number of residual OH groups and a relatively small number of bubbles can be obtained, the energy cost is high, whereas in the case that the oxygen-hydrogen flame which is low in the energy cost is employed, the problem is that the product has a large number of residual-OH groups. Still further, since the shape of ingots which can be produced is restricted to cylindrical and slender shapes, there is a disadvantage to the subsequent processings.

According to the vacuum melting method (3), though a relatively large-sized ingot having a small number of residual OH groups and a high viscosity at high temperatures can be obtained, since the raw material powder filled in a vessel such as a crucible is melted for glass formation, not only is there a difficulty in degassing but also a reaction gas caused by the contact with the vessel is generated and the resulting glass has a relatively large number of bubbles. Therefore, glass having a high quality cannot be obtained. Further, since the rock crystal powders are used, bubbles tend to be generated due to low purity of the raw material per se. Also there is a concern in the raw material supply due to exhaustion of the resources.

Under such a background, the present inventors have developed a process by which a transparent or functional, high-quality glass can be readily produced at a low production cost. This process is characterized in that a silica powder is filled in a suitable vessel, heated in the presence of an accelerator for phase conversion such as an alkali metal component etc. to form a porous body having continuous open pores unified in a crystal phase right below the melting point, and then melted in vacuo for glass formation (see Japanese Patent Application Nos. 181586/84, 181587/84, 181588/84, 170663/85, and 170664/85).

It is known that crystalline silica causes phase conversion from a quartz phase in low-temperature to a tridymite phase and further to a cristobalite phase, depending upon the heating temperature in the heating step. This phase conversion hardly takes place when silica is used alone, but $Li_2O$, $Na_2O$, $K_2O$, $MgO$, $CaO$, $P_2O_5$, and $B_2O_3$ are known to be useful as an accelerator for phase conversion. Since amorphous silica is sintered for glass formation without being crystallized when used alone, in order to crystalize it into a cristobalite phase, the addition of the above-described metal additives is required. Accordingly, in the process of the present invention, the above-described metal component is used in the step for crystallizing the silica powder into the cristobalite phase. However, as will be understood from the foregoing explanation concerning the prior art technologies, in the conventional production methods of glasses, if such a metal component is present in the raw material, such metal component, if any, is likely to cause deterioration in purity of a final product as in the case of OH groups or the like and this is not desirable. That is, in the conventional production methods of glasses, there is a conflicting relation between obtaining a high-quality quartz glass and adding impurities to the raw material or employing a raw material containing impurities.

In view of the foregoing fact, it can be said that the process of the present invention in which an accelerator for phase conversion is added to silica or silica containing an effective component for the phase conversion is selectively used as the raw material is method not available with the conventional concept. The reasons why this process can readily obtain a high-quality glass as compared with the conventional methods is that the characteristics available with a sintered body consisting of a cristobalite phase produce improved effects when with employment of the vacuum melting method. In other words, as is well known, since the melting point of the sintered body is uniquely determined by the cristobalite phase, the sintered body can be heated up to the temperature right below the melting point and subjected to the degassing processing. Further, since the sintered body consisting of a cristobalite phase is a porous body having continuous open pores, it can be degassed thoroughly and readily. Accordingly, if a metal component, such as Na, which is readily decomposed and vaporized at temperatures below the melting point of the sintered body, is employed as an accelerator for phase conversion, a transparent quartz glass from which the impurities (including the accelerator for phase conversion) have almost completely been removed can be obtained. On the other hand, if an accelerator which is not decomposed and removed at said melting point is selected, functional glass containing only the accelerator but free from other impurities can be obtained.

As described in the foregoing, the process for the production of glass according to the present invention is characterized by an orgainic combination of a crystallization step using an accelerator for phase conversion and a glass formation step using a vacuum melting method, and the quality of the sintered molded body obtained in the crystallization step not only brings about a remarkable difference in the quality of the final glass product but also influences the productivity thereof. In other words, since glass formation is carried out finally after removing impurities by a vacuum melting method, it is desired to attain a state in which impurities can be readily removed. As factors for attaining such state, there can be enumerated uniform addition of an accelerator for phase conversion in proper quantities, and the sintered molded body having a self-supporting property and a matrix strength assuring sufficient operability and also having a high porosity. These come into a question coupled with the feature of the process for the production of glass according to the present invention that can produce a relatively large glass ingot.

In view of the above, it is an object of the present invention to provide a process for efficiently producing a high quality glass by means of accomplishment of a uniform addition of an accelerator for phase conversion in proper quantities, thus the sintered molded body having a self-supporting property and a moderate matrix strength and a high porosity can be obtained.

DISCLOSURE OF THE INVENTION

In order to solve the above-described problem, the present invention provides a process for the production of glass comprising heating a silica powder in the presence of a an accelerator for phase conversion to form a sintered body consisting of a cristobalite phase and heat-melting the sintered body in vacuum for glass formation, characterized in that the sintered molded body consisting of a cristobalite phase is produced by (1) preparing and uniformly mixing silica powders containing an excess amount of an accelerator for phase conversion and a silica powder containing substantially no accelerator for phase conversion, filling the resulted silica powder containing a desired amount of the accelerator for phase conversion in a vessel followed by heating the silica powder, or (2) introducing silica powders in a solution containing an accelerator for phase conversion, adjusting the pH of the resultant mixture by the addition of an acid or alkali component, stirring the mixture for mixing, then subjecting it to dehydration and drying treatment, filling the resulting silica powder containing the accelerator for phase conversion in a vessel and heating the silica powder.

As described above, in the process for the production of a glass according to the present invention silica powders containing an accelerator for phase conversion are heat-treated to obtain an molded body having a cristobalite phase, and the accelerator for phase conversion is added to the silica powder usually by admixing the raw material powder in a solution containing the accelerator and stirring the resultant mixture. That is, in the case where an Na component, for example, is used as an accelerator for phase conversion, the component is added to a mixture of water-silica in the form of an aqueous NaOH solution, and the resultant mixture is stirred for mixing, removed the water content is removed and the mixture is dried to obtain silica powders substantially containing an accelerator for phase conversion. In this case, the amount of the Na component to be added is 100 ppm ~ 2,000 ppm expressed as weight ratio based on the raw material powder. It is desirable to obtain silica powders containing about 500 ppm ~ 1,000 ppm of an Na component. However, it has been found that when it is attempted to mix and stir silica powders in an aqueous NaOH solution to form a uniform mixture the stirring characteristics are deteriorated and a uniform mixture is difficult to obtain if a desired amount of the Na component is added. FIG. 1 is a graph plotting experimental data representing the relationship of the amount of Na added where silica powders are stirred for mixing in an aqueous NaOH solution using a stirrer, and pH and stirring torque. As will be clear from this figure, the torque shows a maximum in the vicinity of the desired amount (500 ppm~1,000 ppm) and decreases as the added amount increases to almost reach a minimum with the addition of about 2,300 ppm. Considering the above-described relationship in terms of pH, the stirring torque shows a maximum in the vicinity of pH 7, and with the desired Na addition amount the pH comes near the neutral region accompanied by the increase in the viscosity and remarkable deterioration of stirring characteristics. Therefore, in order to carry out stirring in a low stirring torque state to achieve uniform or efficient mixing it was necessary to make the pH 8.5 or more, that is, addition of Na in an amount of 2,300 ppm or more based on the weight of silica had to be made as will be understood from FIG. 1. Therefore, addition of an excess amount of Na component is a factor which lowers the efficiency of degassing in the step of glass formation or which produces insufficiently degassed products, whereas use of non-uniformly mixed raw material powders does not lead to products of high quality.

On the other hand, in accordance with the process of the present invention, a sintered body having a self-supporting property and a proper matrix strength and porosity can be obtained and degassing treatment can be carried out sufficiently during glass formation by a vacuum melting method since the added amount of an accelerator for crystallization can be controlled by the above-described means and uniform mixing can be carried out readily. Therefore, since poor raw material efficiency which the conventional Verneuil method could not avoid or poor production efficiency in a long glass formation time required can be solved and since no particularly expensive heat source is required, the feature of the present invention that production can be carried out at low cost is further promoted and glass ingots of a high quality can be produced efficiently.

BEST MODE FOR CARRYING OUT THE INVENTION

Figure 1:
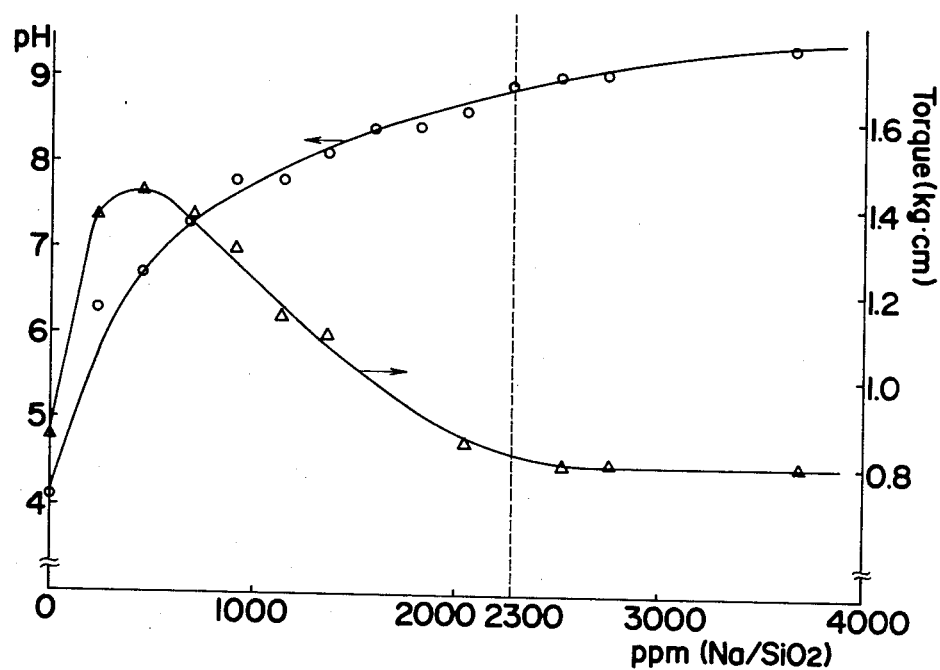
FIG. 1 is a graph showing the relationship between the added amount of Na and pH and stirring torque.

The process of the present invention is based on the above knowledge. Hereinafter, explanation is made on a first embodiment for obtaining a transparent quartz glass. That is, silica powders are introduced in deionized water and stirred for mixing. Then, an Na component in the form of an aqueous NaOH solution is added as an accelerator for phase conversion and stirred, whereas the added amount of the Na component is in excess (for example, 2,300 ppm or more expressed as a weight ratio based on the silica powder) from the above knowledge, and such so that the amount is added as stirring torque is small. After the stirring operation is made sufficiently, solid-liquid separation is carried out by freezing and thawing the resultant solid-liquid mixture or by means of a compressing means such as a filter press or the like, and the solid material obtained is dried to form powders, thus obtaining silica powders containing an excess amount of the Na component. On the other hand, silica powders are introduced to deionized water and stirred for mixing and the resulted mixture is subjected to solid-liquid separation using the above-described means followed by drying to obtain secondary silica powders which do not contain an accelerator for phase conversion. The reason why the above-described treatment is carried out on not only the silica powder containing an accelerator for phase conversion but also the silica powder not containing such accelerator is that a sintered molded body having a cristobalite phase can be made so that it has self-supporting property and higher porosity.

The thus-obtained silica powders are mixed while adjusting the mixing ratio in such a manner that the Na component is contained in an amount of 500 ppm~1,000 ppm in weight ratio based on the mixing powder. Then, after filling the mixed silica powder in a vessel, the mixture is heated to 1,000° C. or more to form a sintered molded body having a cristobalite phase. The sintered body is a porous molded body which has continuous open pores and a shape corresponding to that of the vessel used for filling, and also has a matrix strength sufficient for self-supportedness and transportation. Then, the sintered body is mounted on a saucer-like tray and heated to 1,740° C. or more in a vacuum furnace under a reduced pressure of 0.5 mb or less for glass formation. Since the sintered body is a porous material having continuous open pores as described above, the inherent impurities such as the Na component and the like added to the raw material are heated to the respective heat decomposition temperatures to thereby readily be released and degassed. Further, the degassing treatment is operated very efficiently since the sintered body is of a cristobalite phase right below the melting point and the melting point thereof is unique. That is, if melting occurs step by step, the porous state is deteriorated partially and degassing becomes unsatisfactory but in the present invention the melting point is unique and no such disadvantage as above is observed, and in view of the fact that the higher the temperature the more efficient the adsorption and removal of unused reaction gas unless a decomposition reaction occurs, degassing is efficient to elevate the temperature to a temperature right below the melting point. Accordingly, the inside of the sintered body is substantially evacuated by the time it is melted by the above-described vacuum heating treatment and the content of the Na component added for accelerating the crystallization is decreased finally to several ppm or less, thus enabling one to obtain a transparent quartz glass containing less impurities and no bubbles.

Figure 2:
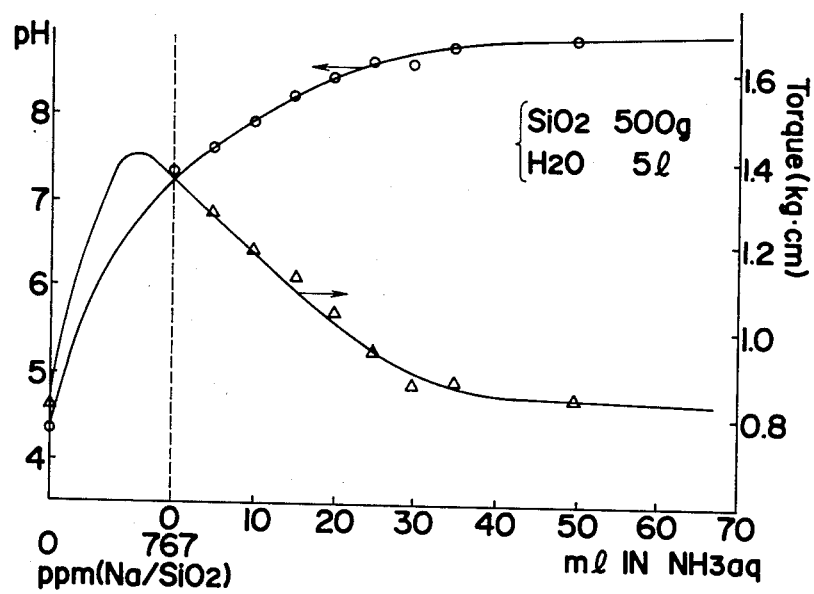
FIG. 2 is a graph showing the relationship between pH and stirring torque when ammonia water is added.
Figure 3:
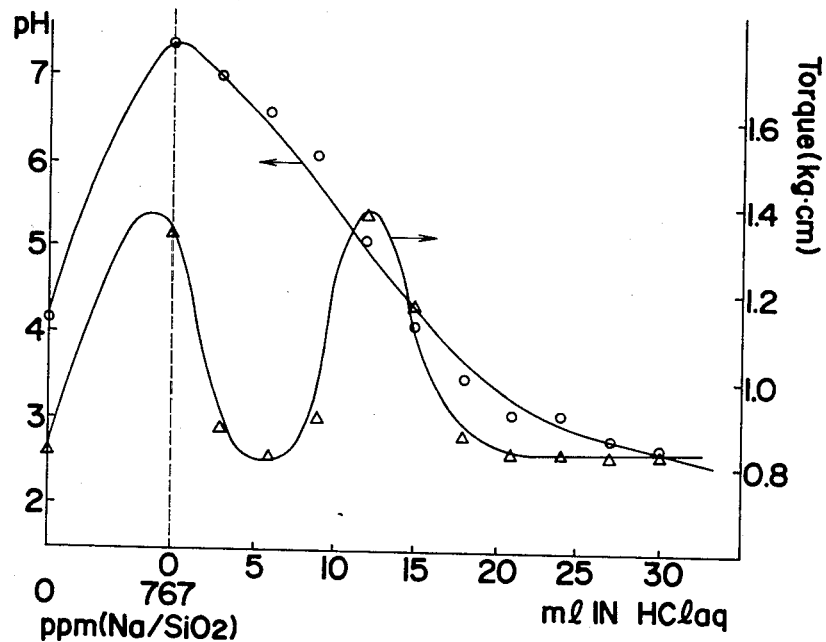
FIG. 3 is a graph showing the relationship between pH and stirring torque when hydrochloric acid is added.

Next, a second embodiment of the process of the present invention will be explained. In the second embodiment, upon the introduction of silica powders in an aqueous NaOH solution followed by stirring for mixing, hydrochloric acid, ammonia water or the like is added to the aqueous NaOH solution as a pH adjusting agent to adjust the pH so that the stirring operation can be carried out under lowest possible stirring torque regardless of the added amount of Na. That is, after silica powders are introduced in a deionized water and stirred for mixing, an Na component as an accelerator for phase conversion is added. The added amount of the Na component is 500 ppm ~1,000 ppm. Since with that added amount the stirring torque is high in the vicinity of a pH 7 as described above, an acid or alkali is added to adjust pH. FIG. 2 shows experimental data when ammonia water is added. As will be apparent from this figure, the stirring torque can be maintained at a minimum by adjusting the pH to 8.5 or more. FIG. 3 shows experimental data when hydrochloric acid is added. The stirring torque can be reduced greatly by adjusting the pH from to 6~7 to 3.5 or less.

By carrying out the stirring operation in this manner followed by dehydrating and drying the solid-liquid mixture there can be formed silica powders containing the desired amount of the Na component. Then, glass is produced in a manner similar to that in the first embodiment.

In contrast to the above explanation which relates to the production of a transparent quartz glass, a high quality functional glass can be obtained by adding accelerators for phase conversion and well known components for activation and by retaining only the activating component but removing other impurity components and the accelerator for phase conversion. Alternatively, a high quality functional glass can be obtained by selectively using a metal component which not only activates glass but also accelerates the crystallization without positively removing and adjusting the metal component.

Upon uniformly adding a desired amount of an accelerator for phase conversion, although silica powders containing an excess amount of the accelerator and one not containing such at all are mixed as set forth in the above explanation, it is also possible, as will be apparent from the explanation on the drawings, to properly prepare silica powders treated with added amounts under low stirring torques. That is, raw material powders containing a desired amount of an accelerator for phase conversion can be obtained by mixing powders containing 2,000 wt. ppm and powders containing 100 wt. ppm. Silica powders which do not contain an accelerator for phase conversion can be used without carrying out the above-described treatment.

TEST EXAMPLE (1)

In a stainless steel cylindrical vessel having an inner diameter of 260 mm and an inner volume of 13 l were introduced 5 l of deionized water, and while stirring the deionized water at normal temperature and under normal pressure 500 g of amorphous silica powders were added thereto to obtain a water-silica mixture. Then, an Na component in the form of a 1 N aqueous NaOH solution was added as an accelerator for phase conversion in an amount of 50 ml. The added amount of the Na component was 2,300 ppm in weight ratio based on the silica and the stirring torque was almost of the lowest value. After stirring for about 60 minutes, the resultant solid-liquid dispersion was subjected to solid-liquid separation using a filter press, and then dried to obtain a silica powder containing about 1,500 ppm of the Na component.

On the other hand, the same amount of the amorphous silica powder was stirred in deionized water and the water-silica mixture thus obtained was subjected to solid-liquid separation and dried, and the product was added to the above-described silica powder containing the Na component and mixed. After it was filled in a mullite cylindrical vessel having an inner diameter of 120 mm and a height of 150 mm, the mixed powder was heated to 1,100° C. in an electric furnace. By this treatment, a 76 mm$\phi$×91 mm cylindrical sintered body having a cristobalite phase was obtained, which was kept at 500° C. or more and placed in a vacuum furnace followed by heating to 1,750° C. in vacuo at a pressure of 0.5 mb or less for glass formation. The temperature elevation pattern in this case was up to 1,600° C. for 3 hours and at 1,750° C. for 1 hour thereafter, and thus a transparent quartz glass of 80 mm$\phi$×45 mm weighing about 500 g was obtained.

TEST EXAMPLE (2)

In a stainless steel cylindrical vessel having an inner diameter of 260 mm and an inner volume of 13 l were placed 5 l of deionized water and while stirring the deionized water at normal temperature and under normal pressure 500 g of an amorphous silica powder were added thereto to form a water-silica mixture. The stirrer used had a vane diameter of 100 mm and was rotated at 350 rpm. The pH was then at about 4.1 and the stirring torque was 0.83 kg. cm. Then, an Na component in the form of a 1 N aqueous NaOH solution was added as an accelerator for phase conversion in a amount of 16.7 ml. The added amount was 767 ppm in terms of weight ratio of the Na component to the silica, which was an amount sufficient for accelerating the crystallization. By the addition, the pH of the mixture became about 7.4 which was in the vicinity of the neutral region, and the viscosity increased so that the stirring torque showed 1.34 kg. cm which was about 1.6 times the value before the addition of the Na component. Since this deteriorated the stirring property, 50 ml of a 1 N aqueous ammonia solution was added as a non-soda alkali. As a result, the pH of the mixture increased to about 8.9 and the stirring torque decreased to 0.83 kg. cm.

After continuing stirring for about 60 minutes, the mixed solution was freezed and thawed, dehydrated, and dried to obtain silica powders containing the Na component in an amount of about 500 ppm (weight ratio). The silica powder thus obtained was subjected to glass formation in a manner similar to that in Test Example (1) to obtain a transparent quartz glass of about 80 mm$\phi$×45 mm weighing about 500 g.

TEST EXAMPLE (3)

To a mixture of a silica-aqueous NaOH solution having a pH of about 7.4 obtained in a manner similar to that in Test Example (2) was added 30 ml of a 1 N aqueous HCl solution to adjust the pH to 2.7 and the resulted mixture was stirred. The stirring torque in this case was 0.83 kg. cm. After continuing stirring for about 60 minutes, the mixture was dehydrated using a filter press, and then dried to obtain silica powders containing about 500 ppm expressed in weight ratio of the Na component.

Then, the silica powder was subjected to glass formation in a manner similar to that in Test Example (1) to obtain a transparent quartz glass of about 80 mm$\phi$×45 mm weighing about 500 g.

TEST EXAMPLE (4)

In a manner similar to that in Test Example (3), 6 ml of a 1 N aqueous HCl solution was added to the mixture for adjustment to make the pH thereof 6.6 followed by stirring. As a result, the stirring torque decreased to 0.82 kg. cm and the mixture was made sufficiently uniform.

Then, the mixture was powdered in the same manner as in Test Example (3) and subjected to glass formation in a manner similar to that in Test Example (1) to obtain a transparent quartz glass of about 80 mm$\phi$×45 mm weighing about 500 g.

INDUSTRIAL APPLICABILITY

The present invention can be utilized as a process for the production of a glass which is used for a jig for use in apparatus for producing semiconductors, for apparatus for physical and chemical use and for optical materials.

We claim:

1. A process for the production of a glass, comprising heating silica powders in the presence of an accelerator for phase conversion to form a sintered molded body having cristobalite phase and heat-melting the body in vacuum for glass formation, characterized in that said sintered body having cristobalite phase is obtained by compounding silica powders containing an excess of a desired amount of the accelerator for phase conversion and silica powders containing substantially no such accelerator, uniformly mixing the powders to form a resulting mixture containing the desired amount of the accelerator for phase conversion, filling the resulting mixture of silica powders containing the desired amount of the accelerator for phase conversion in a vessel, and heating the powders.

2. The process for the production of a glass as claimed in claim 1, characterized in that said accelerator for phase conversion is an Na component.

3. The process for the production of a glass as claimed in claim 1, characterized in that said accelerator for phase conversion is added in an amount of 500 ppm ~1,000 ppm in weight ratio bases on total silica powders.

4. The process for the production of a glass as claimed in claim 1, characterized in that said silica powders having an accelerator for phase conversion are obtained by mixing silica powders with a solution containing an accelerator for phase conversion in an amount greater than the desired amount and subjecting the resulting mixture to dehydration and drying treatment.

5. The process for the production of a glass as claimed in claim 1, characterized in that said silica powders containing substantially no accelerator for phase conversion are untreated or are obtained by mixing silica powders with water and subjecting the resulting mixture to dehydration and drying treatment.

6. The process for the production of a glass as claimed in claim 1, characterized in that said sintered body having cristobalite phase is a molded body which has a self-supporting property and is porous.

7. A process for the production of a glass, comprising heating silica powders in the presence of an accelerator for phase conversion to form a sintered molded body having cristobalite phase and heat-melting the body in vacuum for glass formation, characterized in that said sintered body having cristobalite phase is obtained by providing silica powders in a solution containing an accelerator for phase conversion, adding an acid or basic component to the mixture in an amount effectve to adjust the pH thereof and cause a reduction in the torque required to stir the mixture, stirring the mixture for mixing, subjecting the mixture to dehydration and drying treatment, filling the resultant silica powders containing a desired amount of the accelerator for phase conversion in a vessel and heating the powder.

8. The process for production of a glass as claimed in claim 7, characterized in that said accelerator for phase conversion is an Na component.

9. The process for the production of a glass as claimed in claim 7, characterized in that said accelerator for phase conversion is added in an amount of 500 ppm ~1,000 ppm in terms of weight ratio based on the silica powders.

10. The process for the production of a glass as claimed in claim 7, characterized in that said sintered body having cristobalite phase is a molded body which has a self-supporting property and is porous.

* * * * *